(12) United States Patent  
Cox et al.

(10) Patent No.: US 7,516,918 B2  
(45) Date of Patent: Apr. 14, 2009

(54) MORPHABLE CERAMIC COMPOSITE SKINS AND STRUCTURES FOR HYPERSONIC FLIGHT

(75) Inventors: Brian N. Cox, Thousand Oaks, CA (US); Janet B. Davis, Thousand Oaks, CA (US); Sergio Luis dos Santos e Lucato, Thousand Oaks, CA (US); David B. Marshall, Thousand Oaks, CA (US); Brock S. McCabe, Malibu, CA (US); Olivier H. Sudre, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 474 days.

(21) Appl. No.: 11/432,865

(22) Filed: May 11, 2006

(65) Prior Publication Data  
US 2007/0262201 A1    Nov. 15, 2007

(51) Int. Cl.  
*B64D 29/00* (2006.01)  
*B64C 9/02* (2006.01)  
*B32B 5/08* (2006.01)

(52) U.S. Cl. .................. 244/53 R; 244/53 B; 244/133; 244/38; 428/293.4

(58) Field of Classification Search ............... 244/53 B, 244/53 R, 119, 123.4, 133, 38; 428/293.4  
See application file for complete search history.

(56) References Cited

U.S. PATENT DOCUMENTS

| 3,265,331 | A | * | 8/1966 | Miles | 244/53 B |
| 5,000,399 | A | * | 3/1991 | Readnour et al. | 244/53 B |
| 5,058,826 | A | * | 10/1991 | Coffinberry | 244/53 R |
| 5,098,795 | A | * | 3/1992 | Webb et al. | 428/594 |
| 5,744,252 | A | * | 4/1998 | Rasky et al. | 428/594 |
| 6,089,505 | A | * | 7/2000 | Gruensfelder et al. | 244/53 B |

* cited by examiner

Primary Examiner—Rob Swiatek  
(74) Attorney, Agent, or Firm—Toler Law Group

(57) ABSTRACT

An exemplary morphable ceramic composite structure includes a flexible ceramic composite skin and a truss structure attached to the skin. The truss structure can morph shape of the skin from a first shape to a second shape that is different than the first shape. The flexible ceramic composite skin may include a single-layer of three-dimensional woven fabric fibers and a ceramic matrix composite. The truss structure may include at least one actuatable element or an actuator may move a portion of the truss structure from a first position to a second position. A cooling component may be disposed in thermal communication with the skin. The cooling component may include thermal insulation or a cooling system that circulates cooling fluid in thermal communication with the skin. The morphable ceramic composite structure may be incorporated into any of an air inlet, combustor, exhaust nozzle, or control surfaces of a hypersonic aircraft.

18 Claims, 8 Drawing Sheets

MORPHABLE CERAMIC COMPOSITE SKINS AND STRUCTURES FOR HYPERSONIC FLIGHT

BACKGROUND

In a hypersonic aircraft that includes a scramjet engine, forward speed of the hypersonic aircraft compresses supersonic airflow as it enters a duct of an air inlet of the scramjet engine and passes through the scramjet engine. This compression increases the air pressure higher than that of the surrounding air. In a combustor of the scramjet engine, fuel is ignited in the supersonic airflow. Rapid expansion of hot air out an exhaust nozzle of the scramjet engine produces thrust.

The optimum shape of the duct depends on speed of the hypersonic aircraft. Therefore, for optimum performance the shape of the duct must change as the hypersonic aircraft flies. Typically, shape of the duct has been changed by mechanically moving large panels. This approach involves use of hinges and sliding mechanisms, which are heavy and can experience difficulties with hot seals.

A hypersonic aircraft also includes control surfaces, such as flaps, that are actuated during flight. Typically, control surfaces in hypersonic aircraft have also been actuated mechanically, such as by use of hinges, spindles, and sliding mechanisms. Difficulties have been encountered in controlling temperatures around the spindle. Mechanically actuating the flaps creates a sharp change in angle over the surface of the hypersonic aircraft. This sharp change in angle can cause a separation of flow. Subsequent reattachment of flow causes heating at the reattachment point.

Therefore, it would be desirable to change shape of the duct without use of heavy mechanical actuators and their associated difficulties with hot seals. It would also be desirable to change shape of control surfaces smoothly rather than creating sharp angles and the associated heating due to separation and subsequent reattachment of flow.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

An exemplary morphable ceramic composite structure includes a flexible ceramic composite skin and a truss structure attached to the skin. The truss structure is arranged to morph shape of the skin from a first shape to a second shape that is different than the first shape.

According to an aspect, the ceramic composite skin may include a fiber-matrix combination in which the fiber includes a fiber chosen from a group including carbon, SiC, alumina, mullite, refractory carbides, borides, nitrides, and oxides, and the matrix includes a material chosen from a group including carbon, SiC, alumina, mullite, refractory carbides, borides, nitrides, and oxides. In particular, the fiber-matrix combination may include a fiber-matrix combination chosen from a group that includes C—SiC and SiC—SiC. The fiber may include a single-layer of three-dimensional woven fabric fibers, and the single-layer of three-dimensional woven fabric fibers may define several loops to which the truss structure is attached.

According to another aspect, the truss structure may include at least one actuatable element, and the truss structure may be made from a Kagome lattice structure. Alternately, the morphable ceramic composite structure may further include an actuator that is arranged to move a portion of the truss structure from a first position to a second position.

According to a further aspect, the morphable ceramic composite structure may further include a cooling component in thermal communication with the skin. The cooling component may include thermal insulation. Alternately, the cooling component may include a cooling system configured to circulate a cooling fluid in thermal communication with the skin.

The morphable ceramic composite structure may be incorporated into a hypersonic aircraft that includes a fuselage, a plurality of control surfaces, and a scramjet engine that includes an air inlet, a combustor, and an exhaust nozzle. In such a hypersonic aircraft, at least one of the air inlet, the combustor, the exhaust nozzle, and the plurality of control surfaces includes a flexible ceramic composite skin and a truss structure attached to the skin, the truss structure being arranged to morph shape of the skin from a first shape to a second shape that is different than the first shape.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
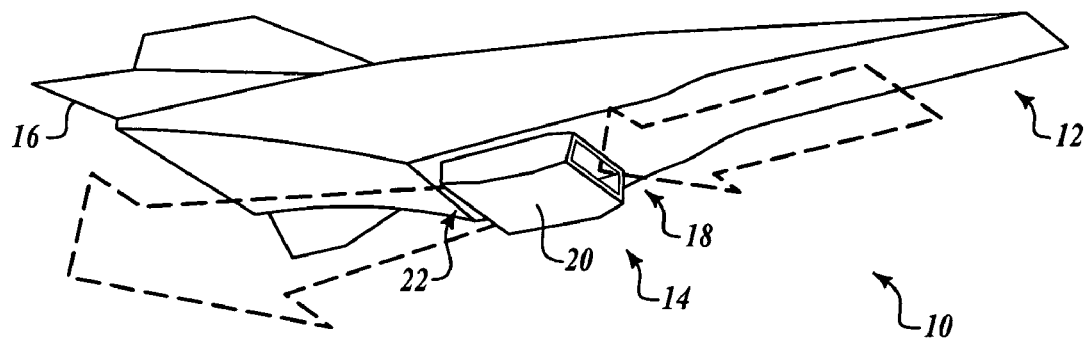
FIG. 1 is a perspective view of a hypersonic aircraft that incorporates morphable ceramic composite structure.

By way of overview and referring to FIG. 1, a hypersonic aircraft 10 incorporates morphable ceramic composite structure. The hypersonic aircraft 10 includes a fuselage 12, a scramjet engine 14, and control surfaces 16 such as flaps. The scramjet engine 14 includes an air inlet 18 with a duct, a combustor 20, and an exhaust nozzle 22. Advantageously, any of the air inlet 18, the combustor 20, the exhaust nozzle 22, and/or the control surfaces 16 includes morphable ceramic composite structure. Exemplary morphable ceramic composite structure includes flexible ceramic composite skin and a truss structure attached to the skin, the truss structure being arranged to morph shape of the skin from a first shape to a second shape that is different than the first shape. As a result, shape of the duct of the air inlet 18 can be changed without use of heavy, conventional mechanical actuators and their associated difficulties with hot seals. Also, shape of the control surfaces 16 can be changed smoothly rather than creating sharp angles as in conventional hypersonic aircraft and the associated heating due to separation and subsequent reattachment of flow.

Figure 2:
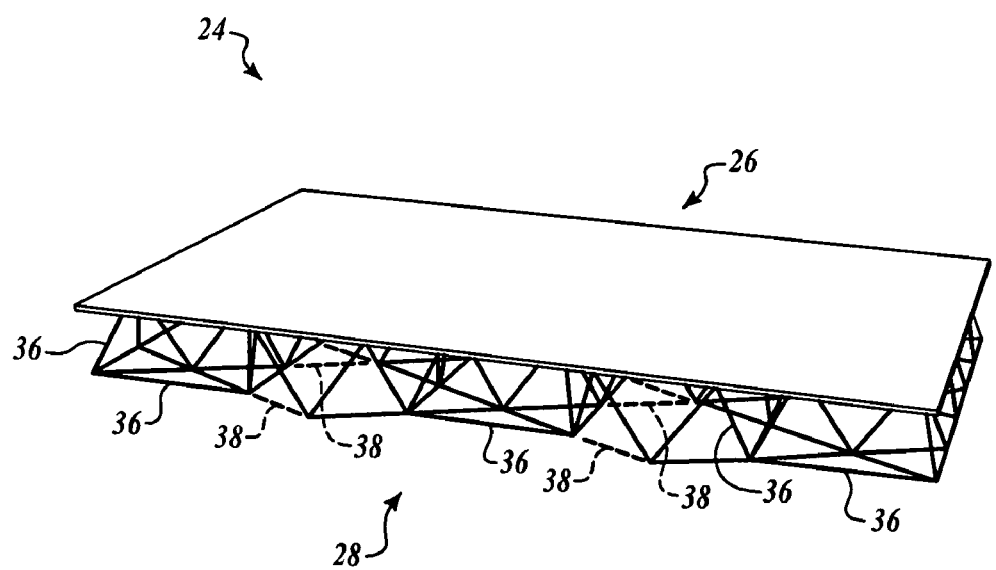
FIG. 2 is a perspective view of exemplary morphable ceramic composite structure.

Still by way of overview and referring additionally to FIG. 2, an exemplary morphable ceramic composite structure 24 includes a flexible ceramic composite skin 26 and a truss structure 28 attached to the skin 26. The truss structure 28 is arranged to morph shape of the skin 26 from a first shape to a second shape that is different than the first shape. Advantageously, the morphable ceramic composite structure 24 may be used as skin and actuator for any of the air inlet 18, the combustor 20, the exhaust nozzle 22, and/or the control surfaces 16 of the hypersonic aircraft 10. The morphable ceramic composite structure 24 can be incorporated as skin and actuator for any of the air inlet 18, the combustor 20, the exhaust nozzle 22, and/or the control surfaces 16 without any need to make changes to known flight control systems. Details of exemplary embodiments will be set forth below.

Figure 3:
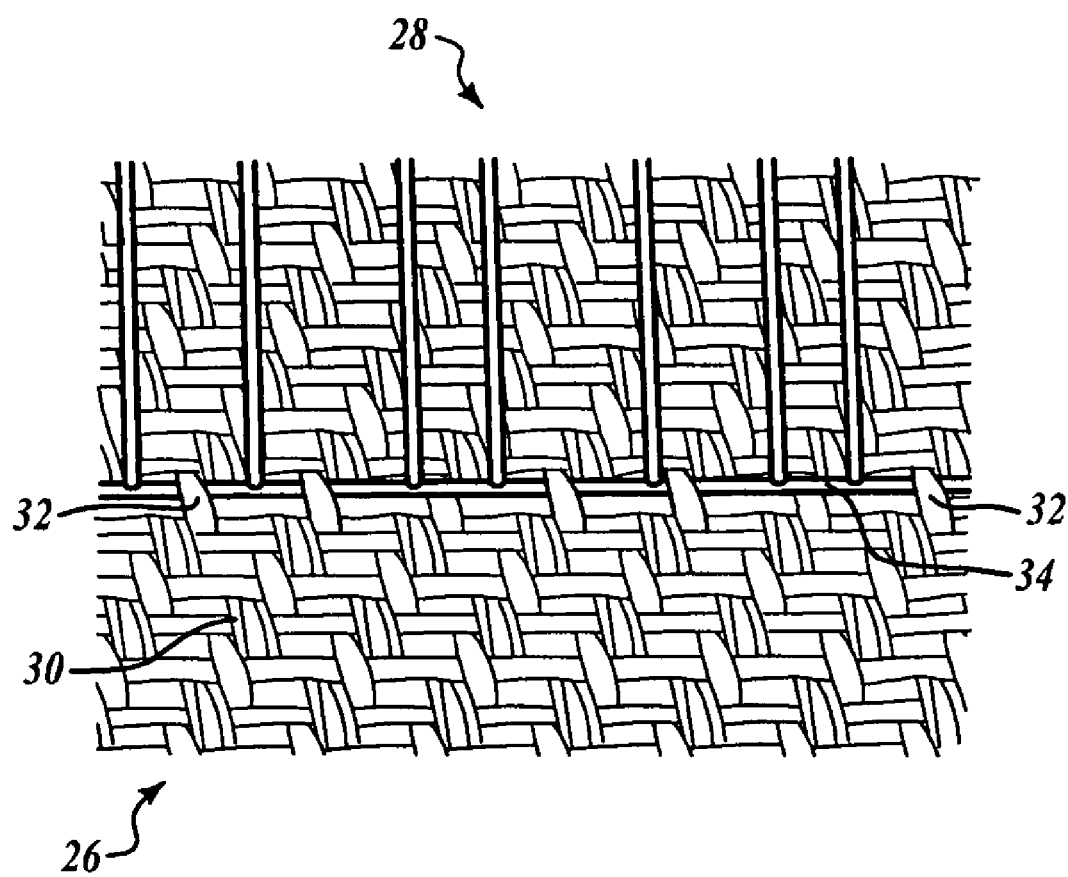
FIG. 3 is a plan view of details of exemplary morphable ceramic composite structure.

Referring now to FIG. 3, the skin 26 is a thin, flexible ceramic composite skin. Advantageously, the skin 26 is morphable, exhibits elastic response that enables the possibility of large elastic deflections, is resistant to fatigue and damage, is thermally robust, and has high toughness. In an exemplary embodiment, the skin 26 may have a thickness on the order of around one millimeter or so.

The skin 26 suitably is a textile-based ceramic composite skin with three-dimensional reinforcement. In an especially exemplary embodiment, the skin 26 is a single-layer, woven fiber preform 30. Unlike conventional ceramic composites (that typically may be made from up to ten or so layers of fabric or tape and that can delaminate in regions between layers), use of a single layer of woven fabric mitigates possibility of delamination.

Advantageously, use of single-layer, woven fiber enables attachment of the skin 26 to the truss structure 28. Because the woven fiber preform 30 is three-dimensional, some of the fibers extend from a top surface through the thickness to a bottom surface of the woven fiber preform 30. Loops 32 are made from some of these fibers that extend through the thickness of the woven fiber preform 30. Several of the loops 32 suitably are formed over a large area of the woven fiber preform 30. An attachment member 34 of the truss structure 28 (that is attached to other members of the truss structure 28, such as by welding) is received in the loop 32, thereby attaching the skin 26 to the truss structure 28. Attachment of the skin 26 to the truss structure 28 via the loops 32 over a large area of the woven fiber preform 30 provides for a strong, mechanical attachment that is distributed over the surface of the woven fiber preform 30.

In an exemplary embodiment, the skin 26 suitably is a ceramic matrix composite. Use of a ceramic composite skin provides thermal robustness to withstand high temperature environments, such as components of the scramjet engine 14 (FIG. 1) and the control surfaces 16 (FIG. 1) of the hypersonic aircraft 10 (FIG. 1). Carbon fiber-reinforced composites are especially well-suited for use as the skin 26. Given by way of non-limiting example, the skin 26 suitably may be made of fiber-matrix combinations such as without limitation C—SiC and SiC—SiC. If desired, fiber-reinforced composites including refractory borides, such as without limitation ZrB and HfB and oxides, such as without limitation alumina, mullite, monazite, may be used to further improve high temperature properties of the skin 26. However, a tradeoff is experienced with use of oxides because the matrix is not as strong as matrices with carbides. To that end, the most common high temperature composites suitably used for the skin 26 may include C—C, C—SiC, SiC—SiC, mullite-alumina, and mullite-monazite. Fibers that are currently available commercially include carbon, SiC, alumina, and mullite. However, fibers could potentially be made from many other compounds, such as refractory carbides, borides, nitrides, or oxides. The matrix can include any of these materials or mixtures of them. Moreover, new compositions can be more readily introduced in the matrix than in the fibers—and many such mixtures have been produced (such as carbides and borides of Zr, Hf, Ti, and Ta).

Referring back to FIG. 2, the truss structure 28 provides the stiffness, load-carrying capability, and movements desired for the specified component. The truss structure 28 desirably is made from a strong, lightweight material such as without limitation a superalloy. However, the truss structure 28 may be made from any high temperature metal as desired, such as without limitation Ni or Co based superalloys, molybdenum alloys, or niobium alloys. The truss structure 28 could also be made from a ceramic matrix composite, if desired.

The truss structure 28 may be any lattice as desired. For example, given by way of non-limiting example, in some embodiments the truss structure may be a one-dimensional array of inverted pyramids. As shown in FIG. 2, in an exemplary embodiment the truss structure 28 is a Kagome lattice. The Kagome lattice provides an optimal combination of stiffness and load-bearing capacity. In addition, the Kagome lattice lends itself to efficient actuation (while remaining stiff statically).

The truss structure 28 may be self-actuated or, as discussed later, may be externally actuated by an actuator that is external to the truss structure 28. In an exemplary embodiment the truss structure 28 is self-actuated. To that end, the Kagome lattice is especially well-suited for self-actuation. Still referring to FIG. 2, the truss structure 28 is a lattice of fixed members 36. Predetermined members of the Kagome lattice are replaced by linear actuators 38. The linear actuators enable controlled, large-scale deformations along multiple lines. Advantageously, in a Kagome lattice, actuation of selected linear actuators 38 produces desired deformation in the attached skin 26 without inducing strain in the fixed members 36. The members of the Kagome lattice to be replaced with the linear actuators 38 are identified by determining desired deflection, such as through modeling and analysis using finite element model analysis and optimization routines. As a result, existing flight control systems need not be modified in order to incorporate the morphable ceramic composite structure 24.

If desired., the truss structure 28 may include more than one type of actuator to perform more than one function. In an exemplary embodiment, the actuators in the truss structure 28 serve the purpose of inducing a large deformation. Other functions may include without limitation inducing small, high-frequency deformations to counter vibrations and noise that may be caused by flight conditions. Furthermore, the truss structure 28 may include sensors (not shown) of various kinds to enable additional functionality such as measurement of mechanical loads, such as pressure and vibration, and thermal loads. The sensors may include without limitation any acceptable pressure sensor, accelerometer, or temperature sensor such as a thermocouple, as desired. These sensors may be electronically or logically connected to the actuators.

The linear actuator 38 can be selected as desired. For example, the linear actuator 38 can be a shape memory alloy, such as a Nitinol wire or an electromechanical motor such as stepper motor or piezoelectric motor or hybrid actuations system such as piezo-hydraulic actuator.

Figure 4A:
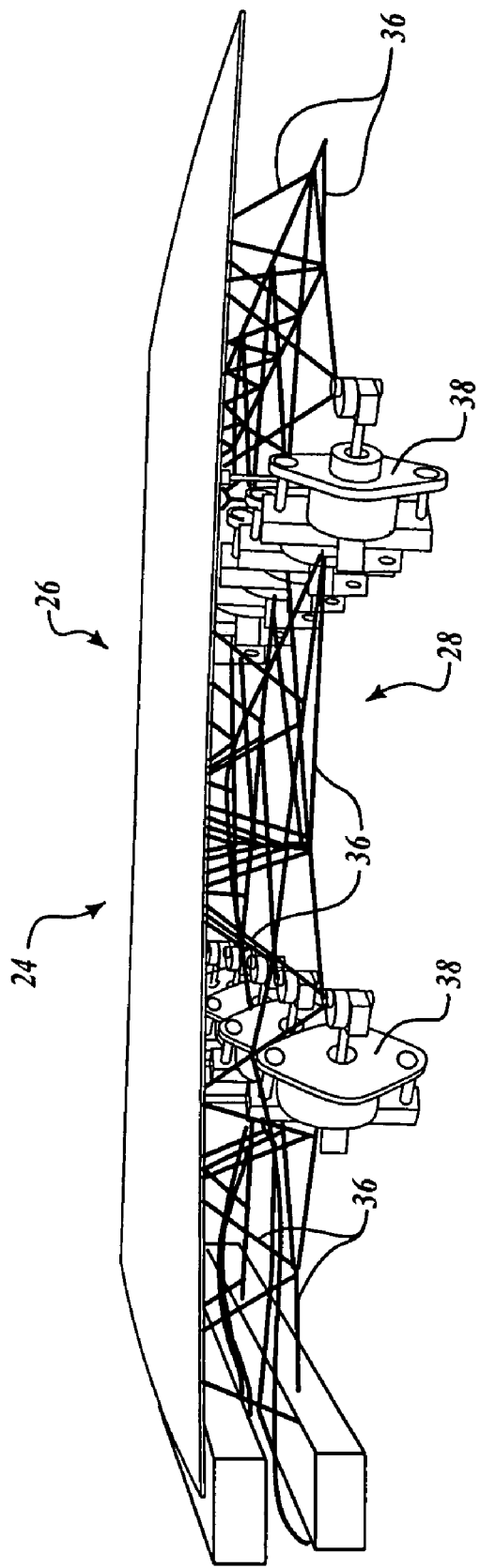
FIGS. 4A-4C are perspective views of an exemplary morphable ceramic composite structure.
Figure 4B:
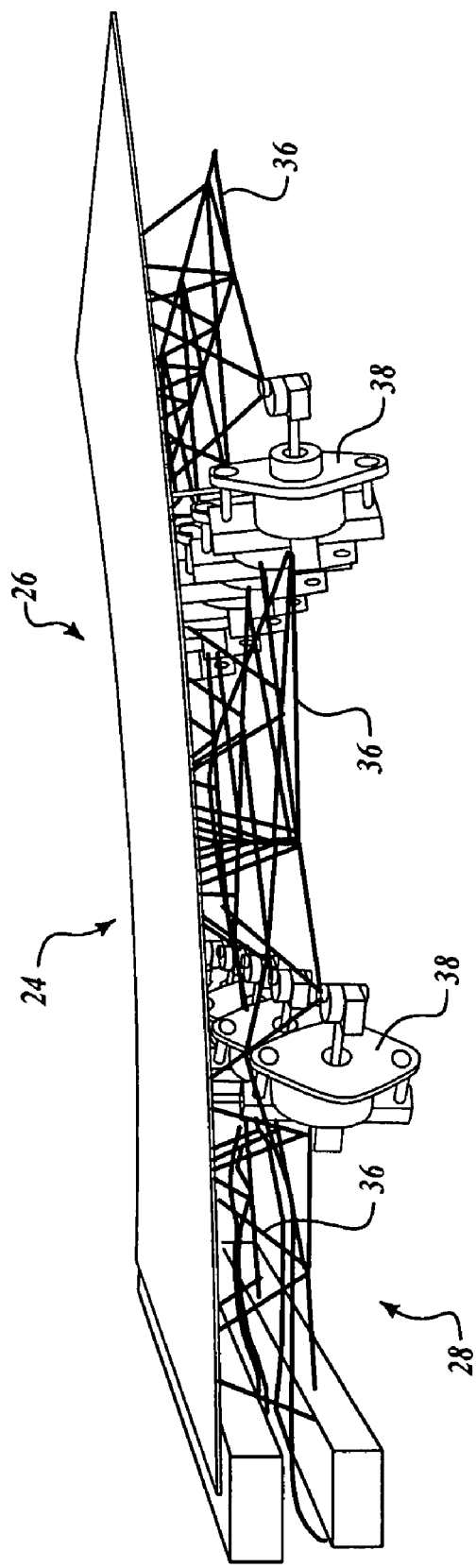
Figure 4C:
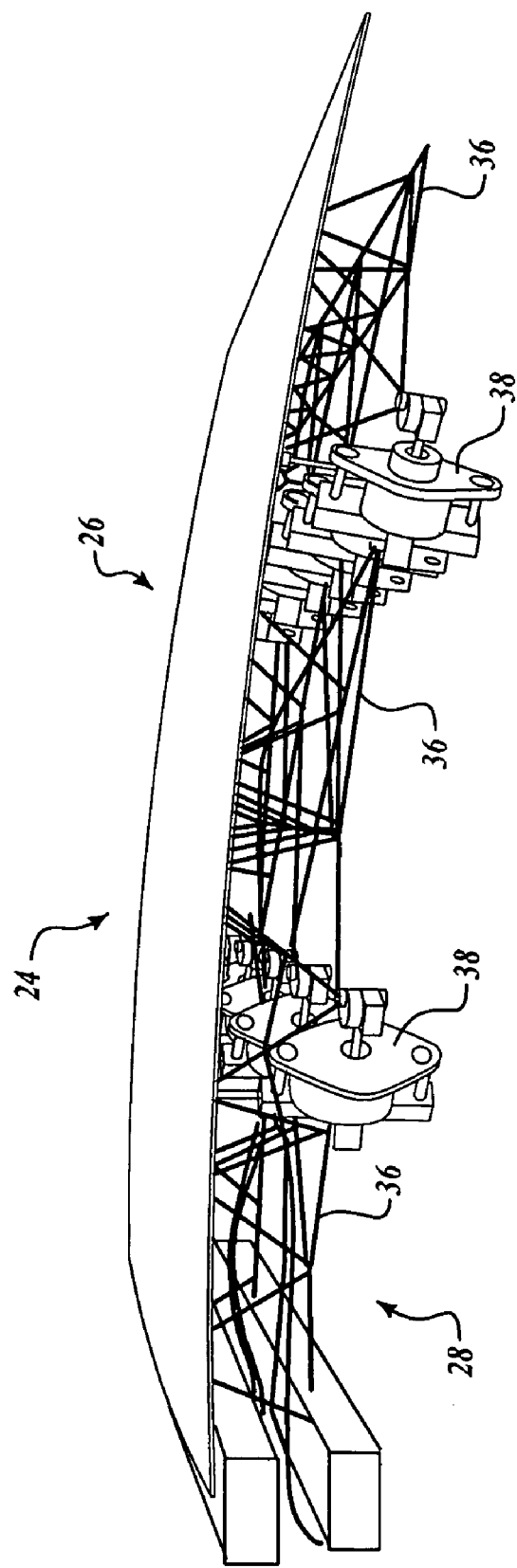

Referring now to FIG. 4A, as a further example the linear actuator 38 can be an electric stepper motor. In an exemplary embodiment, the morphable ceramic composite structure 24 includes the skin 26 that is attached to the truss structure 28. The truss structure 28 is a Kagome lattice that includes the fixed members 36. Predetermined members of the Kagome lattice are replaced with electric stepper motors that serve as the linear actuators 38. The skin 26 is in an undeflected condition. Referring to FIG. 4B, the linear actuators (that is, the electric stepper motors) have caused the skin 26 to smoothly morph upwardly from the undeflected condition of FIG. 4A. The amount of upward deflection is more than one inch. Referring to FIG. 4C, the linear actuators (that is, the electric stepper motors) have caused to skin 26 to smoothly morph downwardly from the undeflected condition of FIG. 4A. The amount of downward deflection is more than one inch.

Figure 5:
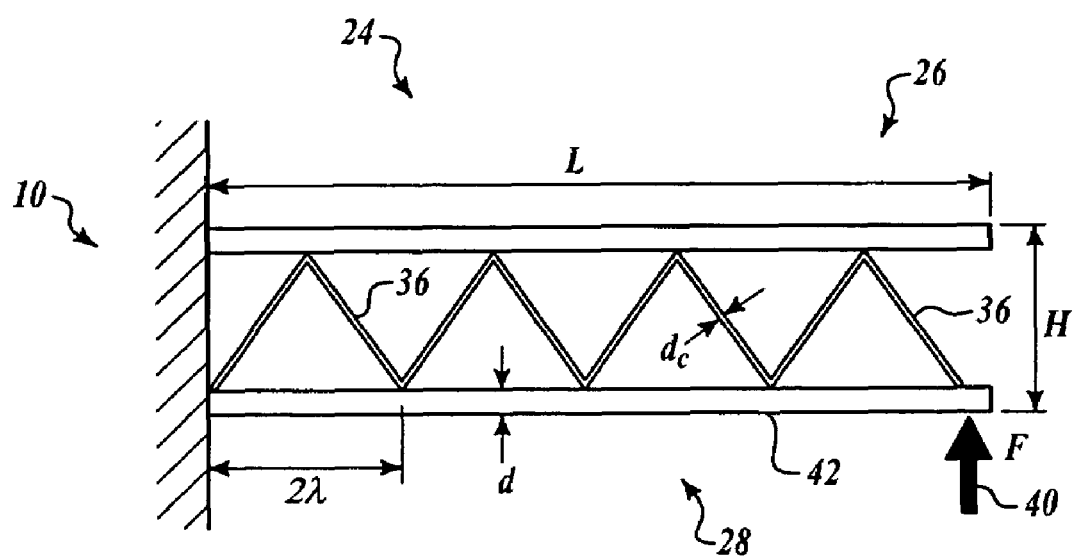
FIG. 5 is a side view of another exemplary morphable ceramic composite structure.

Referring now to FIG. 5, the truss structure 28 suitably may be externally actuated. That is, the truss structure 28 is actuated by an external actuator 40. The truss structure may be any lattice as desired. Advantageously, the lattice for an externally actuated truss may be simpler than that for an internally actuated truss. For example, the lattice may be a one-dimensional triangular array of fixed members 36. The external actuator 40 is not an internal member of the truss structure 28. Instead, the external actuator is a separate component, such as a piston like a hydraulic piston or the like, that exerts a force onto a base portion 42 of the truss structure 28. Thus, the external actuator 40 causes the externally actuated truss structure 28 to react against a part of the structure of the hypersonic aircraft 10. Advantageously, controlling one external actuator 40 in an externally actuated truss is less complex than controlling an array of linear actuators 38 (FIGS. 2 and 4A-4C) in an internally actuated truss.

It is desirable to design truss structures (that is, distribution and dimensions of truss elements) for general actuation and pressure loading conditions, subject to various constraints on actuation forces, static stiffness, weight, and the like. For example, it is desirable to minimize weight of the morphable ceramic composite structure 24 while providing for a specified amount of deflection as well as averting failure of the morphable ceramic composite structure 24. Typically, in order to minimize weight of the morphable ceramic composite structure 24, thickness of the components (such as the skin 26, the fixed members 36, and the base portion 42) is reduced. The amount of allowable reduction is limited by the load requirements.

Figure 6:
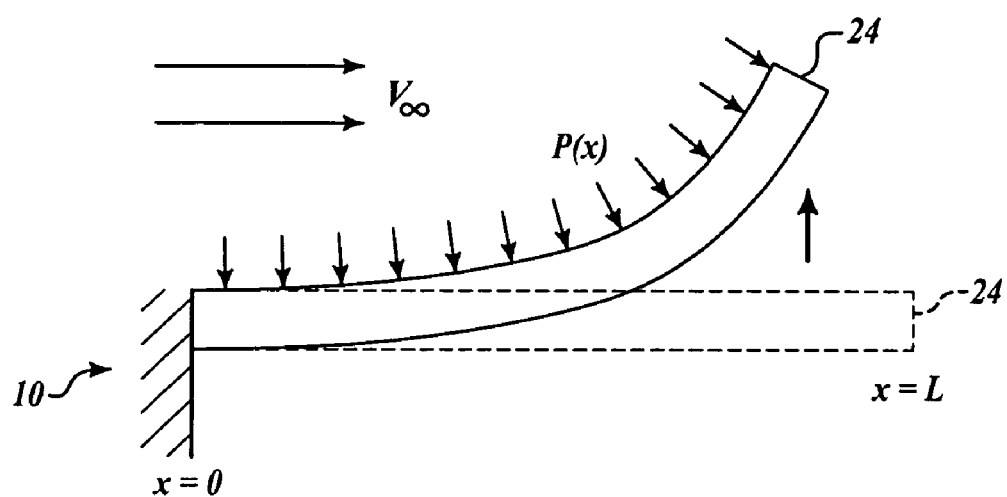
FIG. 6 illustrates morphing of an exemplary morphable ceramic composite structure.

Referring additionally to FIG. 6, the morphable ceramic composite structure 24 that includes an externally actuated truss is designed with nonuniform bending stiffness along its length, so that under the combined loads of actuation and aerodynamic pressure the desired deformation is produced.

Figure 7A:
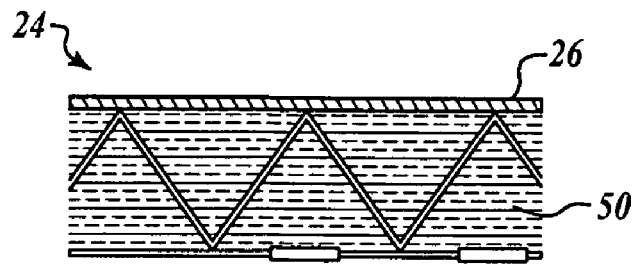
FIG. 7 illustrates cooling of morphable ceramic composite structure.
Figure 7B:
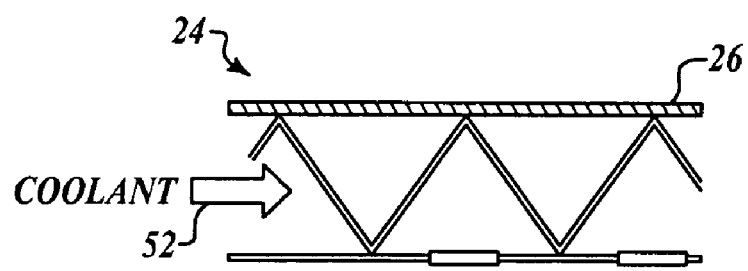
Figure 7C:
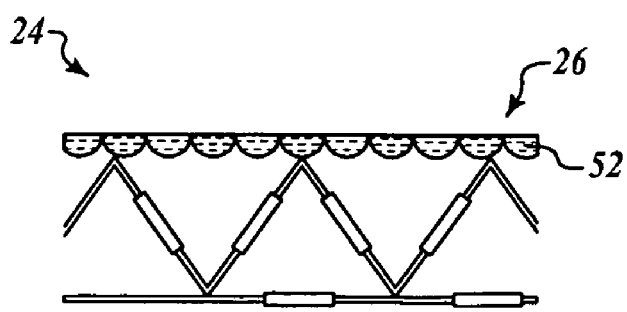

Referring now to FIGS. 7A-7C, as discussed above the flexible ceramic composite skin 26 is thermally robust and can withstand high temperature environments that result from, for example, combustion gases and reattachment of previously-separated flow. Thus, the skin 26 serves in part to separate a hot gas from cooler internal structures. To that end, it is desirable to provide a cooling component for the flexible ceramic composite skin 26. As discussed below, the cooling component may be a passive cooling component or an active cooling component, depending on the application of the morphable ceramic composite structure 24, heat flux environments, and other vehicle constraints.

For example, in FIG. 7A the cooling component suitably is a passive cooling component, such as thermal insulation 50, that is appropriate for moderate conditions. Given by way of non-limiting example, the insulation 50 may be rigid fibrous insulation such as $SiO_2$, $AlO_2$, or the like. Alternately, the insulation 50 may be a loose fiber bedding of alumina, or a flexible blanket, or an aerogel, or the like. The insulation 50 is appropriate for use in moderate conditions, such as the control surfaces 16 (FIG. 1) like flaps.

In more severe conditions that present changing heat fluxes, active cooling is appropriate. For example, in FIG. 7B a cooling fluid, or coolant, 52 is circulated in contact with the skin 26. The coolant 52 is sealed inside the skin 26. In some embodiments, the coolant 52 may be the fuel that is burned in the scramjet engine 14 (FIG. 1). Circulation of the coolant 52 as shown in FIG. 7B is well-suited for the air inlet 18 (FIG. 1). Alternately, the coolant 52 may be flowed within hollow truss members. Further, the coolant may be flowed through porosity in the skin 26 to give transpiration cooling.

In the hottest regions, such as the combustor 20 (FIG. 1) and the exhaust nozzle 22 (FIG. 1), as shown in FIG. 7C the skin 26 may be provided in the form of tubes and the coolant 52 flows through the tubes of the skin 26. Again, the coolant 52 suitably may be the fuel that is burned in the scramjet engine 14 (FIG. 1).

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A morphable ceramic composite structure comprising:
   a flexible ceramic composite skin including a single-layer of three-dimensional woven fabric fibers that define a plurality of loops; and
   a truss structure attached to the plurality of loops of the flexible ceramic composite skin, the truss structure being arranged to morph shape of the skin from a first shape to a second shape that is different than the first shape.

2. The structure of claim 1, wherein the ceramic composite skin further includes a fiber-matrix combination, wherein:
   the fiber includes a fiber chosen from a group including carbon, SiC, alumina, mullite, refractory carbides, borides, nitrides, and oxides; and
   the matrix includes a material chosen from a group including carbon, SiC, alumina, mullite, refractory carbides, borides, nitrides, and oxides.

3. The structure of claim 2, wherein the fiber-matrix combination includes a fiber-matrix combination chosen from a group that includes C—SiC and SiC—SiC.

4. The structure of claim 1, wherein the truss structure is made from a material chosen from a group including a superalloy, a molybdenum alloy, a niobium alloy, and a ceramic composite matrix.

5. The structure of claim 1, wherein the truss structure includes at least one actuatable element.

6. The structure of claim 5, wherein the actuatable element includes an actuator chosen from a group including a shape memory alloy actuator and an electric stepper motor and a piezoelectric motor and a piezo-hydraulic motor.

7. The structure of claim 1, further comprising an actuator that is arranged to move a portion of the truss structure from a first position to a second position.

8. The structure of claim 1, further comprising a cooling component in thermal communication with the skin.

9. The structure of claim 8, wherein the cooling component includes thermal insulation.

10. The structure of claim 8, wherein the cooling component includes a cooling system configured to circulate a cooling fluid in thermal communication with the skin.

11. The structure of claim 10, wherein;
the skin includes a plurality of ceramic matrix composite tubes; and
the cooling system is further configured to circulate the coolant inside the plurality of tubes.

12. A morphable ceramic composite structure comprising:
a flexible ceramic composite skin;
a truss structure attached to the skin, the truss structure being arranged to morph shape of the skin from a first shape to a second shape that is different than the first shape, the truss structure including at least one actuatable element, the truss structure being made from a material chosen from a group including a superalloy, a molybdenum alloy, a niobium alloy, and a ceramic composite matrix; and
a cooling system configured to circulate a cooling fluid in thermal communication with the skin.

13. The structure of claim 12, wherein the actuatable element includes an actuator chosen from a group including a shape memory alloy actuator and an electric stepper motor and a piezoelectric motor and a piezo-hydraulic motor.

14. A morphable ceramic composite structure comprising:
a flexible ceramic composite skin including a single-layer of three-dimensional woven fabric fibers that define a plurality of loops;
a truss structure attached to the plurality of loops of the flexible ceramic composite skin, the truss structure being arranged to morph shape of the skin from a first shape to a second shape that is different than the first shape, the truss structure being made from a material chosen from a group including a superalloy, a molybdenum alloy, a niobium alloy, and a ceramic composite matrix; and
an actuator that is arranged to move a portion of the truss structure from a first position to a second position.

15. A hypersonic aircraft comprising:
a fuselage;
a plurality of control surfaces; and
a scramjet engine including an air inlet, a combustor, and an exhaust nozzle;
wherein at least one of the air inlet, the combustor, the exhaust nozzle, and the plurality of control surfaces includes:
a flexible ceramic composite skin including a single-layer of three-dimensional woven fabric fibers that define a plurality of loops; and
a truss structure attached to the plurality of loops of the flexible ceramic composite skin, the truss structure being arranged to morph shape of the skin from a first shape to a second shape that is different than the first shape.

16. The aircraft of claim 15, wherein the truss structure includes at least one actuatable element.

17. The aircraft of claim 15, further comprising an actuator that is arranged to move a portion of the truss structure from a first position to a second position.

18. The aircraft of claim 15, further comprising a cooling component in thermal communication with the skin.

* * * * *